(12) United States Patent
Caffrey

(10) Patent No.: US 6,249,412 B1
(45) Date of Patent: Jun. 19, 2001

(54) JUNCTION BOX WITH OVER-CURRENT PROTECTION

(75) Inventor: James Caffrey, Glencrea (IE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 09/315,641

(22) Filed: May 20, 1999

(51) Int. Cl.⁷ ................................................ H02H 3/00
(52) U.S. Cl. ..................... 361/93.1; 361/103; 361/115
(58) Field of Search ................................. 361/794, 783, 361/782, 93.1, 103, 115; 338/195, 225; 29/827

(56) References Cited

U.S. PATENT DOCUMENTS

| | | | |
|---|---|---|---|
| 2,878,357 | 3/1959 | Thomson | 201/73 |
| 3,964,087 | 6/1976 | Mallon | 338/306 |
| 4,151,401 | 4/1979 | Van Bokestal et al. | 219/508 |
| 4,228,418 | * 10/1980 | Piedmont et al. | 338/195 |
| 4,251,793 | 2/1981 | Vind | 338/22 R |
| 4,318,072 | 3/1982 | Zandman | 338/7 |
| 5,379,190 | 1/1995 | Hanamura et al. | 361/766 |
| 5,761,051 | 6/1998 | Tran | 361/794 |
| 5,802,709 | 9/1998 | Hogge et al. | 29/827 |
| 5,852,397 | 12/1998 | Chan et al. | 338/22 R |
| 5,864,281 | 1/1999 | Zhang et al. | 338/22 R |

FOREIGN PATENT DOCUMENTS

| | | | |
|---|---|---|---|
| 2331708 | 1/1975 | (DE) | H02H/5/04 |
| 2761204 | 9/1998 | (FR) | H01R/25/16 |

* cited by examiner

Primary Examiner—Josie Ballato
Assistant Examiner—Sharon Polk
(74) Attorney, Agent, or Firm—Klein & Szekeres, LLP

(57) ABSTRACT

A junction box includes an array of conductive polymer positive temperature coefficient (PTC) devices formed from a laminate of a layer of conductive polymer PTC material between first and second metal foil layers. The first foil layer is divided, by conventional masking and etching techniques, into an array of discrete positive electrodes, each of which defines a single PTC over-current protection device having a predetermined trip current. The second foil layer is maintained intact and is shared by the PTC devices in the array as a common ground electrode. Each discrete positive electrode is contacted by a conductive spring contact finger. Two or more contact fingers can be formed as parts of single contact element or otherwise connected together to connect two or more devices in parallel, thereby providing a higher trip current than is provided by a single device.

13 Claims, 1 Drawing Sheet

JUNCTION BOX WITH OVER-CURRENT PROTECTION

CROSS-REFERENCE TO RELATED APPLICATIONS

Not Applicable

FEDERALLY-SPONSORED RESEARCH OR DEVELOPMENT

Not Applicable

BACKGROUND OF THE INVENTION

This invention relates to the field of over-current protection devices, and particularly the field of resettable fuses. More specifically, the invention relates to resettable fuse devices that are fabricated from a conductive polymer material with a positive temperature coefficient (PTC). In a specific embodiment, the present invention relates to a junction box, for a cable harness or the like, that incorporates an array of conductive polymer PTC devices for over-current protection.

The use of conductive polymer PTC devices for over-current protection and for other applications has become well-known in the art. See, for example, U.S. Pat. No. 5,802,709 and the references cited therein. A particular form of conductive polymer PTC device that has achieved widespread use is the type fabricated from a layer of conductive polymer PTC material laminated between a pair of metal foil layers that are formed into electrodes. Devices of this type, and a method of fabricating them, are disclosed in U.S. Pat. No. 5,802,709, the disclosure of which is expressly incorporated herein by reference.

The use of resettable over-current protection devices is desired in certain applications, for example, cable harness junction boxes for motor vehicles. Where over-current protection is provided by standard fuses, the cable harness must be routed so that the junction box is accessible to replace blown fuses. Resettable over-current protection devices, by contrast, do not need to be accessible; hence, the location of the junction box is less important, and the cable harness can be routed more efficiently. Consequently, PTC over-current protection devices, especially devices made of a conductive polymer PTC material, have become more common in cable harness junction boxes.

Heretofore, those cable harness junction boxes that employ PTC conductive polymer devices for over-current protection have used a plurality of discrete devices. While such junction boxes have, for the most part, achieved satisfactory performance objectives, there has been a continuing need to reduce manufacturing costs below the costs associated with discrete devices.

SUMMARY OF THE INVENTION

Broadly, the present invention is an over-current protection device, specifically an over-current protection junction box, comprising a grid or array of conductive polymer PTC components, wherein the array is formed by (1) laminating a layer of conductive polymer PTC material between first and second layers of metal foil, and (2) dividing the laminate into an array of discrete conductive polymer PTC components, all sharing a common ground electrode formed by the lower foil layer. The step of dividing the laminate is preferably performed by masking the first foil layer to expose a grid pattern on the surface of the first foil sheet, and then etching through the first foil layer to form an array of discrete positive electrodes, separated by a grid of exposed polymer material, each of which defines a single conductive polymer PTC device. Optionally, the exposed polymer material can also be removed, by conventional methods, to define a grid of channels separating the discrete positive electrodes to define the individual devices. Each discrete positive electrode is contacted by a conductive spring contact finger. Two or more contact fingers can be arranged to connect two or more devices in parallel, to provide a higher trip current than is provided by a single device. Thus, for example, each single, discrete device may have a trip current of a basic value, so that trip currents in multiples of the basic value can be provided by multiple devices connected in parallel by suitably-arranged spring contact fingers. Thus, the same array of conductive polymer PTC devices can be used with different spring contact arrangements when different mixes of current ratings are desired.

As will be better appreciated from the detailed description that follows, the present invention provides a junction box with over-current protection that can be easily and economically manufactured, and that is conveniently used with cable harnesses and the like. Moreover, each such device in accordance with the present invention can accommodate a wide variety of wiring configurations and mixes of current ratings. These and other advantages of the present invention will be more easily understood from the detailed description that follows.

DETAILED DESCRIPTION OF THE INVENTION

Figure 1:
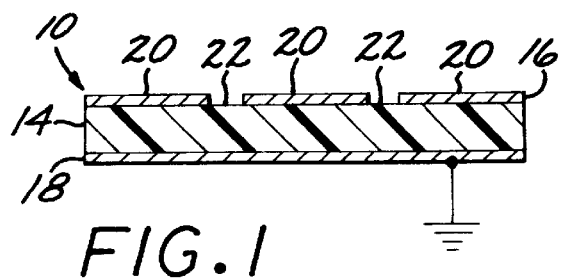
FIG. 1 is a cross-sectional view of a first form of an array of PTC devices, as used in a junction box in accordance with the present invention.
Figure 2:
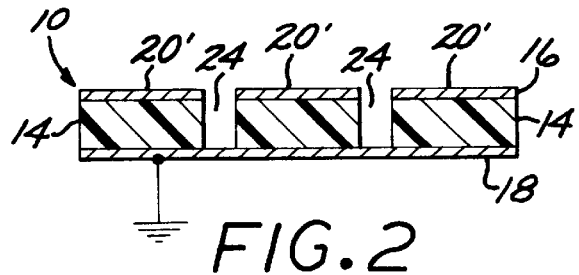
FIG. 2 is a cross-sectional view of a second form of an array of PTC devices, as used in a junction box in accordance with the present invention.
Figure 3:
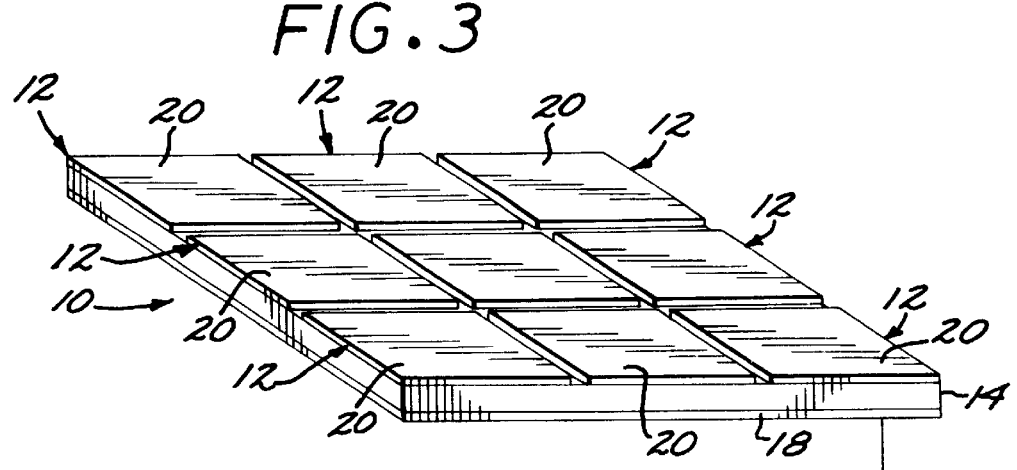
FIG. 3 is a perspective view of the array of FIG. 1.

FIGS. 1, 2, and 3 illustrate an array 10 of laminar conductive polymer PTC devices 12 configured for use in the present invention. The array 10 is manufactured by laminating a layer 14 of conductive polymer PTC material between upper and lower foil layers 16, 18 of conductive metal. A method for performing this lamination process, including the specific materials preferred for use in the PTC layer 14 and the foil layers 16, 18, is disclosed in U.S. Pat. No. 5,802,709, supra.

Figure 4:
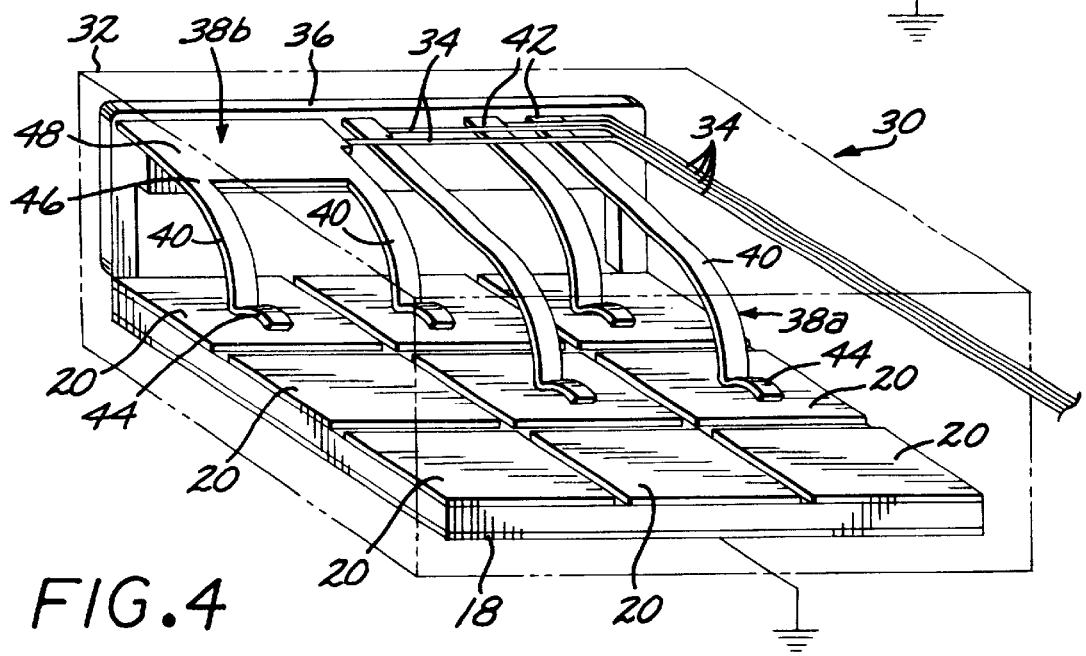
FIG. 4 is a perspective view of a junction box in accordance with the present invention.

As shown in FIGS. 1, 3, and 4, the laminate of PTC material and foil layers 16, 18 may be divided into the array 10 of individual devices 12 by applying a photoresist masking layer on the upper foil layer 16 to mask an appropriate pattern on the upper foil layer 16, and then etching away the unmasked areas of the upper foil layer 16 by conventional techniques. When the masking layer is removed, a pattern of laminar positive or "hot" electrodes 20 is created, wherein the electrodes 20 are separated by a grid 22 of exposed polymer material. The lower foil layer 18 remains intact as a laminar common ground electrode.

Alternatively, as shown in FIG. 2, an array of individual devices 12 may be formed by masking and etching the upper foil layer 16, as described above, and then removing the polymer layer 14, by conventional techniques, leaving a pattern of positive electrodes 20' separated by a grid of inter-device channels 24 when the masking layer is removed. The steps of masking and etching the upper foil layer 16 and then removing the polymer layer 14 are performed by conventional methods, well-known in the pertinent arts. As in the FIG. 1 embodiment, the lower foil layer 18 is left intact to serve as a common ground electrode.

Referring now to FIG. 4, a junction box 30 that incorporates the PTC device array 10 is shown. The junction box 30 includes a housing 32 (shown in phantom outline). The housing 32 has an aperture or slot for passage of a cable that comprises a plurality of wires 34 having remote ends (not shown) connected to other electronic circuits or electrical components (not shown).

The junction box housing 32 contains an insulative mounting member 36 to which is attached a plurality of single conductive spring contact elements 38a and, optionally, one or more ganged spring contact elements 38b. Each of the single spring contact elements 38a comprises a single resilient spring contact finger 40 having a first end 42 that is fixed to the mounting member 36, and a free end that terminates in a contact pad 44 that makes contact with a single positive electrode 20 (or 20'). Each of the ganged spring contact elements 38b (only one of which is shown) comprises two or more contact fingers 40 having first ends 46 joined to each other and to the mounting member 36 by a conductive plate or strip 48. Each of the contact fingers 40 of the ganged spring contact element(s) 38b also has a free end that terminates in a contact pad 44 that makes contact with a single positive electrode 20 (or 20'). Each of the conductive spring contact elements 38a, 38b is electrically connected to one of the wires 34, preferably directly, as shown (e.g., by a solder connection). Alternatively, the electrical connection can be made indirectly (e.g., by means of a conductive trace, not shown, on the mounting member 36).

In a specific embodiment of the invention, each of the individual PTC over-current protection devices may be rated at 5 amps. In other words, a current exceeding 5 amps will trip the device into a very high resistance state due to I$^2$R heating, thereby effectively creating an open circuit as if the device 12 were a blown fuse. Thus, each of the single finger contact elements 38a, contacting a single device 12, will create a circuit having, in effect, a 5 amp fuse. By contrast, each of the multifinger or ganged contact elements 38b is in contact with two or more devices 12, which are connected by the fingers 40 of each of the ganged contact elements 38b in parallel. This multiplies the current-carrying capacity or current rating of the circuit that includes each ganged contact element 38b by the number of devices 12 connected in parallel by that contact element. Thus, for example, if each of the devices 12 is rated at 5 amps, the two-fingered ganged contact element 38b shown in FIG. 4, by connecting two of the devices 12 in parallel, creates a circuit rated at 10 amps.

In designing a junction box in accordance with the present invention, it may be desirable to employ an array 10 having a relatively large number of individual over-current protection devices 12, each of which has a relatively low current rating or trip current. In such a junction box, any desired current rating can be obtained by connecting several devices in parallel using multi-fingered ganged contact elements. Preferably, the several over-current protection devices employed in any one circuit are situated at widely-separated locations in the array. The advantage of this arrangement is improved heat dissipation and less likelihood of inadvertent chain-reaction tripping of devices due to the heat generated by the over-current in a single circuit. Where a large number of circuits are to be protected, the junction box may contain several arrays 10 in a vertically-stacked relationship. Optimum thermal characteristics can be provided in a multiple array junction box by connecting devices in different arrays in parallel to obtain a particular current rating. While a specific preferred embodiment has been described above and in the accompanying drawings, it will be appreciated that a number of variations and modifications may suggest themselves to those skilled in the pertinent arts. For example, the number and arrangement of the devices 12 in the array 10 may be varied in accordance with design considerations and circuit requirements. Likewise, as mentioned above, multiple arrays 10 can be provided in a stacked relationship within the junction box housing. Moreover, the devices 12 can either be of identical size to provide the same current ratings, or they can be of various sizes to provide a number of different current ratings within the same junction box. Furthermore, parallel connections between two or more devices 12 can be effected by electrically connecting two or more spring contact fingers 40 by any suitable means other than the ganged contact elements 38b used in the above-described preferred embodiment. These and other variations and modifications that may suggest themselves are considered within the spirit and scope of the present invention, as defined in the claims that follow.

What is claimed is:

1. An over-current protection junction box, comprising:
   an array of discrete conductive polymer PTC devices sharing a common ground electrode; and
   a plurality of contact elements, each of which is in electrical contact with at least one of the PTC devices.

2. The junction box of claim 1, wherein the array of PTC devices comprises a layer of conductive polymer PTC material laminated between an upper foil sheet and a lower foil sheet, the upper foil sheet being divided into an array of discrete upper electrodes, the lower foil sheet forming the common ground electrode.

3. The junction box of claim 2, wherein each of the contact elements includes a spring contact finger positioned to contact one of the upper electrodes.

4. The junction box of claim 1, wherein all of the PTC devices are rated at approximately the same tripping current.

5. The junction box of claim 1, wherein the PTC devices in the array are separated from each other by a grid of channels.

6. An over-current protection junction box, comprising:
   an array of laminar conductive polymer PTC over-current protection devices interconnected by a common laminar ground electrode, each of the devices having a discrete laminar positive electrode; and
   a plurality of contact elements, each of which is in contact with the positive electrode of at least one of the over-current protection devices.

7. The over-current protection junction box of claim 6, wherein each of the contact elements includes a spring contact finger positioned to contact one of the positive electrodes.

8. The over-current protection junction box of claim 6, wherein at least one of the contact elements is a ganged contact element, and wherein at least two of the over-current protection devices are connected in parallel by the ganged contact element.

9. The over-current protection junction box of claim 7, wherein at least one of the contact elements is a ganged contact element that includes at least two spring contact fingers, each of which contacts one of the over-current protection devices so as to connect the over-current protection devices in parallel.

10. The over-current protection junction box of claim 6, wherein all of the over-current protection devices are rated at approximately the same tripping current.

11. A method of making an over-current protection junction box, comprising the steps of:
   (a) laminating a layer of conductive polymer PTC material between first and second layers of conductive metal foil; and
   (b) forming the first foil layer into an array of discrete electrodes.

12. The method of claim 11, wherein the step of forming comprises the steps of:
   (b)(1) masking the first foil layer with a masking layer to define an unmasked grid pattern on the first foil layer;
   (b)(2) etching the unmasked grid pattern to create a grid of exposed conductive polymer PTC material; and
   (b)(3) removing the masking layer.

13. The method of claim 11, wherein the step of forming comprises the steps of:
   (b)(1) masking the first foil layer with a masking layer to define an unmasked grid pattern on the first foil layer;
   (b)(2) etching the unmasked grid pattern to create a grid of exposed conductive polymer PTC material;
   (b)(3) removing the grid of exposed conductive polymer PTC material to create a grid of channels; and
   (b)(4) removing the masking layer.

* * * * *